US012111217B2

(12) United States Patent
Takada et al.

(10) Patent No.: US 12,111,217 B2
(45) Date of Patent: Oct. 8, 2024

(54) STRAIN SENSOR FIXING DEVICE AND TORQUE SENSOR USING THE SAME

(71) Applicant: NIDEC COPAL ELECTRONICS CORPORATION, Tokyo (JP)

(72) Inventors: Kazuhiro Takada, Sano (JP); Takatoshi Inoguchi, Sano (JP); Takayuki Endo, Sano (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 307 days.

(21) Appl. No.: 17/681,084

(22) Filed: Feb. 25, 2022

(65) Prior Publication Data

US 2022/0178772 A1 Jun. 9, 2022

Related U.S. Application Data

(63) Continuation of application No. PCT/JP2020/036737, filed on Sep. 28, 2020.

(30) Foreign Application Priority Data

Oct. 9, 2019 (JP) .................................. 2019-186024
Oct. 9, 2019 (JP) .................................. 2019-186025

(51) Int. Cl.
    *G01L 1/22*     (2006.01)
    *G01L 3/10*     (2006.01)

(52) U.S. Cl.
    CPC ............ *G01L 1/2206* (2013.01); *G01L 3/108* (2013.01)

(58) Field of Classification Search
    CPC ..... G01L 1/2206; G01L 3/108; G01L 3/1457; G01L 1/2231
    See application file for complete search history.

(56) References Cited

U.S. PATENT DOCUMENTS

| | | | |
|---|---|---|---|
| 3,960,013 | A | 6/1976 | Ormond |
| 4,064,744 | A | 12/1977 | Kistler |
| 4,543,814 | A | 10/1985 | Heilman |
| 4,793,189 | A | 12/1988 | Dell'Orto et al. |

(Continued)

FOREIGN PATENT DOCUMENTS

| | | |
|---|---|---|
| CN | 2525490 | 12/2002 |
| CN | 101678538 | 3/2010 |

(Continued)

OTHER PUBLICATIONS

International Search Report for corresponding International Application PCT/JP2020/036737, mailed Dec. 1, 2020.

(Continued)

*Primary Examiner* — David J Bolduc
(74) *Attorney, Agent, or Firm* — Burris Law, PLLC

(57) ABSTRACT

A fixing member includes a first side, second side parallel to the first side, and face provided between the first side and second side and including an opening. The face is provided at a position separate from a line connecting between the first side and second side, first side is brought into line contact or point contact with the first structure, and second side is brought into line contact with an end part of a strain (Continued)

body constituting a strain sensor, the end part being provided on the first structure. A screw is inserted into the opening and is screwed into the first structure.

20 Claims, 7 Drawing Sheets

(56) References Cited

U.S. PATENT DOCUMENTS

| | | | |
|---|---|---|---|
| 2003/0000316 A1 | 1/2003 | Isono | |
| 2004/0181312 A1* | 9/2004 | Miura | B25J 13/085 700/258 |
| 2006/0107767 A1* | 5/2006 | Kawabata | B60N 2/002 73/862.627 |
| 2007/0084294 A1* | 4/2007 | Kobayashi | G01L 1/2231 73/781 |
| 2009/0126500 A1* | 5/2009 | Ito | G01L 1/2231 73/781 |
| 2013/0104666 A1* | 5/2013 | Takuma | G01L 1/2206 73/855 |
| 2014/0338989 A1* | 11/2014 | Aoyama | G01G 19/4142 177/136 |
| 2014/0338990 A1* | 11/2014 | Aoyama | B60N 2/002 177/136 |
| 2015/0047439 A1* | 2/2015 | Ogawa | G01L 1/2206 73/862.621 |
| 2015/0135847 A1 | 5/2015 | Takahama | |
| 2016/0265988 A1* | 9/2016 | Saito | G01L 1/2262 |
| 2017/0266814 A1 | 9/2017 | Uemura et al. | |
| 2020/0400515 A1* | 12/2020 | Endo | G01L 1/22 |
| 2021/0325266 A1* | 10/2021 | Endo | G01L 1/2206 |

FOREIGN PATENT DOCUMENTS

| | | |
|---|---|---|
| CN | 106461477 | 2/2017 |
| CN | 108827521 | 11/2018 |
| CN | 109923389 | 6/2019 |
| CN | 109952497 | 6/2019 |
| CN | 110125986 | 8/2019 |
| EP | 2322905 | 5/2011 |
| EP | 2851649 | 3/2015 |
| EP | 3779390 | 2/2021 |
| JP | S55102409 | 7/1980 |
| JP | S6267206 | 4/1987 |
| JP | 2003014563 | 1/2003 |
| JP | 2011191126 | 9/2011 |
| JP | 2013096735 | 5/2013 |
| JP | 2015049209 | 3/2015 |
| JP | 2017172983 | 9/2017 |
| JP | 2018025402 | 2/2018 |
| WO | 2018186008 | 10/2018 |

OTHER PUBLICATIONS

European Search Report issued in corresponding EP Application 20873961.5, issued Oct. 4, 2023, 7 pages.

Office Action issued in corresponding CN Application 202080060759.2, issued Oct. 19, 2023, and an English Translation, 24 pages.

* cited by examiner

STRAIN SENSOR FIXING DEVICE AND TORQUE SENSOR USING THE SAME

CROSS-REFERENCE TO RELATED APPLICATIONS

This application is a continuation of International Application No. PCT/JP2020/036737, filed on Sep. 28, 2020, which claims priority to and the benefit of Japanese Patent Application No. 2019-186024, filed on Oct. 9, 2019 and Japanese Patent Application No. 2019-186025, filed on Oct. 9, 2019. The disclosures of the above applications are incorporated herein by reference.

FIELD

Embodiments of the present disclosure relate to a strain sensor fixing device to be provided on, for example, an articulation of a robot arm and torque sensor using the same.

BACKGROUND

A torque sensor includes a first structure to which torque is applied, second structure from which torque is output, and a plurality of strain parts serving as beams configured to couple the first structure and the second structure to each other, and a plurality of strain gages functioning as sensor elements are arranged on each of these strain parts. A bridge circuit is constituted of the plurality of strain gages (see, for example, Patent Literatures 1 (JP 2013-096735 A), 2 (JP 2015-049209 A), and 3 (JP 2017-172983 A)).

SUMMARY

In general, a strain sensor is provided with, on a metallic strain body, a plurality of strain-gages functioning as sensor elements. As a method of fixing the strain sensor to a torque sensor, there are, for example, a method adopting welding, method using an adhesive, and method using a plurality of screws.

However, when the strain sensor is fixed to the structure by welding, an abrupt temperature rise of the strain body attributable to the welding concomitantly occurs. Accordingly, there is a possibility of the composition and shapes of the strain body and strain gages being changed, and performance of the strain sensor being adversely affected.

Further, when the strain sensor is fixed to the structure by using an adhesive, the adhesive having low stiffness is interposed between the strain body and structure. Accordingly, deformation of the structure is not directly transmitted to the strain body, and there is a possibility of the sensitivity of the strain sensor being deteriorated.

On the other hand, when the strain sensor is fixed to the structure by using screws, a pressing member is provided on the strain body, and by fastening the pressing member to the structure by means of the screws, the strain body is fixed to the structure by the pressing member. In the case of such a configuration, the pressing member and strain body come into surface contact with each other, and hence the pressing member needs to maintain high suppress strength with respect to the strain body. In order to maintain high suppress strength, upsizing and a high degree of stiffness enhancement of the pressing member, and upsizing of the screws and increasing of the number of the screws are required. Accordingly, it becomes difficult to realize downsizing and thinning of the torque sensor including the pressing member and screws.

An embodiment described herein aims to provide a strain sensor fixing device capable of securely fixing the strain sensor to the structure while preventing the sensor performance from being deteriorated and further preventing the device configuration from being upsized, and torque sensor using the strain sensor fixing device.

A strain sensor fixing device according to an embodiment includes a fixing member which includes a first side, second side parallel to the first side, and face provided between the first side and second side and including an opening, and in which the face is provided at a position separate from a line connecting between the first side and second side, first side is brought into contact with a first structure, and second side is brought into line contact with an end part of a strain body constituting a strain sensor, the end part being provided on the first structure, and screw to be inserted into the opening and to be screwed into the first structure.

A torque sensor of an embodiment includes a first structure, a second structure, a plurality of third structures connecting between the first structure and the second structure, strain bodies each of which is provided between the first structure and the second structure and constitutes a strain sensor, first fixing devices each of which is provided on the first structure and fixes a first end of the strain body to the first structure, and second fixing devices each of which is provided on the second structure and fixes a second end of the strain body to the second structure, wherein each of the first fixing device and the second fixing device includes a fixing member which includes a first side, a second side parallel to the first side, and a face provided between the first side and the second side and including an opening, and in which the face is provided at a position separate from a line connecting between the first side and the second side, the first side is brought into contact with the first structure, and the second side is brought into line contact with an end part of the strain body constituting the strain sensor, the end part being provided on the first structure, and a screw to be inserted into the opening and to be screwed into the first structure.

Additional objects and advantages of the disclosure will be set forth in the description which follows, and in part will be obvious from the description, or may be learned by practice of the disclosure. The objects and advantages of the disclosure may be realized and obtained by means of the instrumentalities and combinations particularly pointed out hereinafter.

DRAWINGS

The accompanying drawings, which are incorporated in and constitute a part of the specification, illustrate embodiments of the disclosure, and together with the general description given above and the detailed description of the embodiments given below, serve to explain the principles of the disclosure.

DETAILED DESCRIPTION

Figure 1:
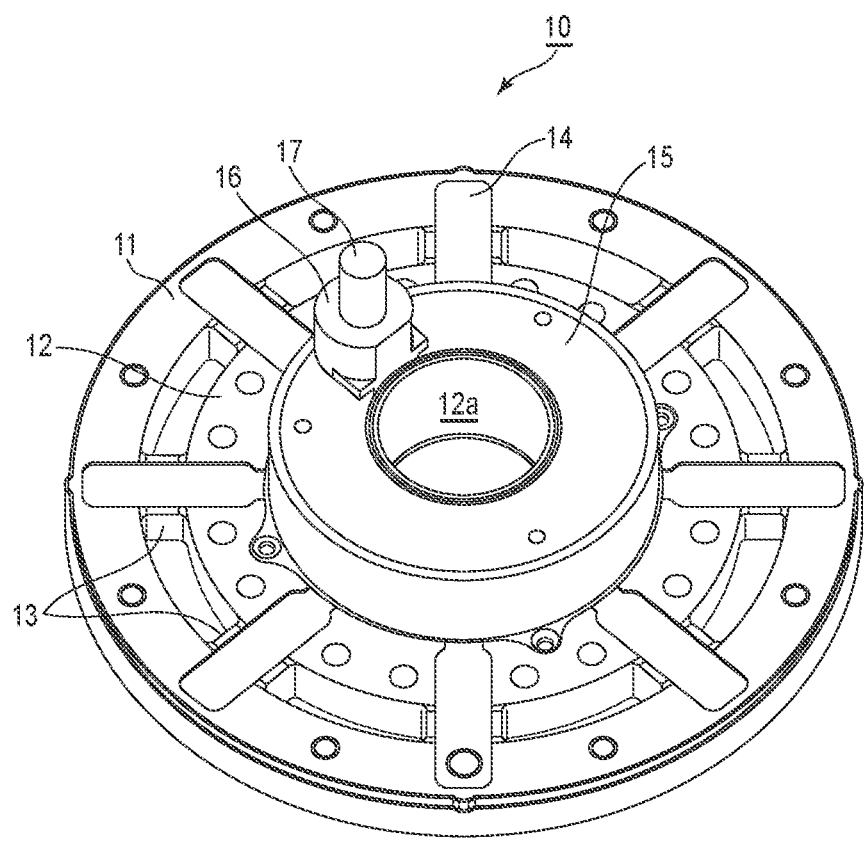
FIG. 1 is a perspective view showing a torque sensor to which this embodiment is applied.

An embodiment of the present disclosure will be described below with reference to the accompanying drawings. In the drawings, the same parts are denoted by the same reference symbols.

Figure 2:
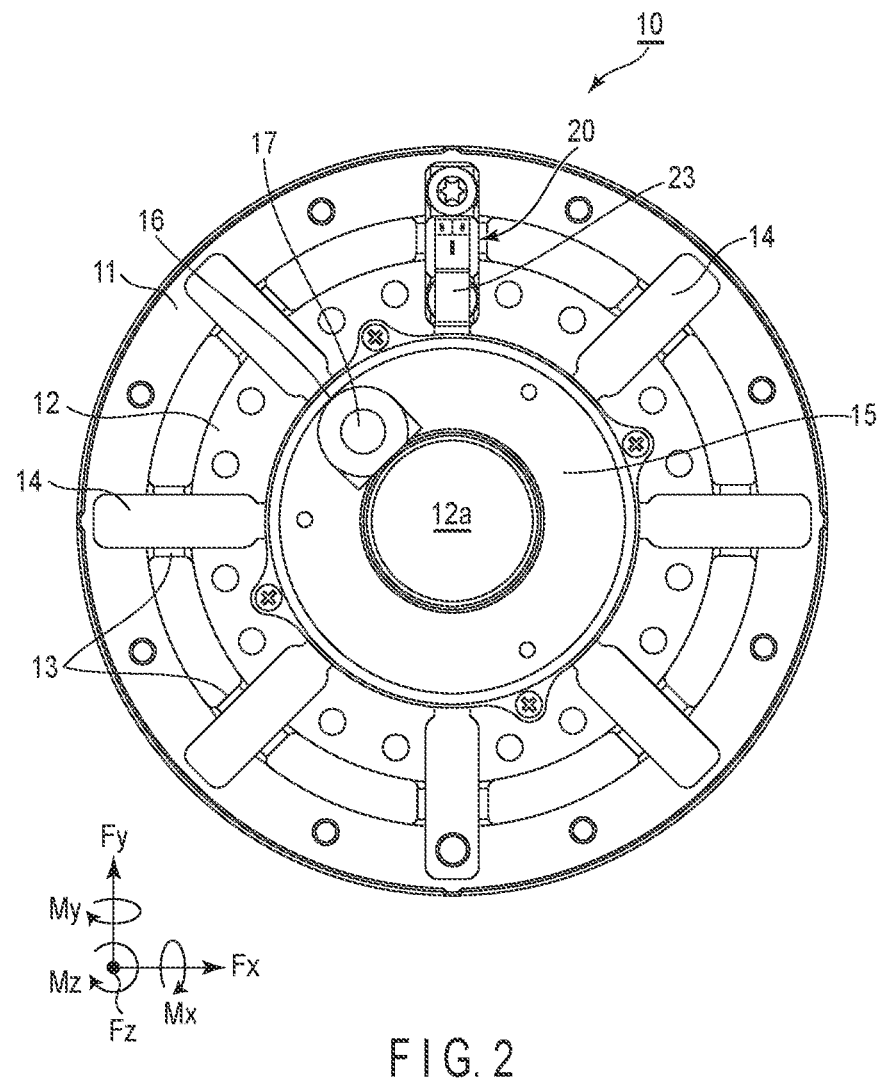
FIG. 2 is a plan view showing FIG. 1 part of which is removed.

FIG. 1 and FIG. 2 show an example of a torque sensor 10 to which this embodiment is applied. The configuration of the torque sensor 10 is not limited to this, and this embodiment can be applied to torque sensors of various configurations. Further, this embodiment can be applied not only to torque sensors but also to a force sensor or the like using strain gages.

In FIG. 1, the torque sensor 10 includes a first structure 11, second structure 12, a plurality of third structures 13, a plurality of waterproof caps 14, case 15, bush 16, and cable 17.

The first structure 11 and second structure 12 are each formed annular and diameter of the second structure 12 is less than the diameter of the first structure 11. The second structure 12 is arranged concentric with the first structure 11, and first structure 11 and second structure 12 are coupled to each other by the third structures 13 serving as a plurality of radially arranged beams. The number of the third structures 13 is, for example, eight, and the eight third structures 13 are arranged at regular intervals. The number of the third structures 13 is not limited to eight.

The first structure 11 is coupled to, for example, a body to be measured, second structure 12 is connected to another structure not shown, and plurality of third structures 13 transmit torque (moment (Mz) shown in FIG. 2) from the first structure 11 to the second structure 12. Conversely, the second structure 12 may be coupled to the body to be measured, first structure 11 may be connected to another structure not shown, and torque may be transmitted from the second structure 12 to the first structure 11 through the plurality of third structures 13.

It should be noted that in the case of the force sensor, the first structure 11, second structure 12, and third structures 13 are three-dimensionally deformed, and force (Fx, Fy, Fz) and moment (Mx, My, Mz) are detected with respect to the three axes (x, y, z) orthogonal to each other shown in FIG. 2.

Although the first structure 11, second structure 12, and plurality of third structures 13 are constituted of a metal, for example, stainless steel, if strength mechanically sufficient relatively to the applied torque is obtained, it is possible to use materials other than metals.

As shown in FIG. 2, strain sensors 20 to be described later are arranged correspondingly to the third structures 13 as shown in FIG. 2, and each strain sensor 20 is covered with a cap 14. In FIG. 2, one of the caps 14 is detached and strain sensor 20 is exposed. Although in this embodiment, the number of the strain sensors 20 is made equal to the number of the third structures 13, the number of the strain sensors 20 is not limited to this, and number of the strain sensors 20 may be less than the number of the third structures 13.

The configurations of the strain sensors 20 are identical to each other. The strain sensor 20 is provided between the first structure 11 and second structure 12. That is, as will be described later, one end part of the strain sensor 20 is joined to the first structure 11, and the other end part of the strain sensor 20 is joined to the second structure 12.

The second structure 12 includes a hollow part 12a, and case 15 is attached to a part of the second structure 12 around the hollow part 12a. Inside the case 15, a processing circuit (not shown) configured to process an electrical signal supplied from the strain sensor 20 to thereby create a torque detection signal functioning as a sensor signal is provided.

A bush 16 configured to retain the cable 17 is provided at a part of the case 15. One end (not shown) of the cable 17 is connected to the processing circuit inside the case 15 and the other end of the cable 17 is passed through, for example, the hollow part 12a. The cable 17 supplies electric power to the processing circuit from outside and outputs a sensor signal processed by the processing circuit to the outside. The configuration of the processing circuit is not essential to this embodiment, and hence a description thereof is omitted.

Figure 3:
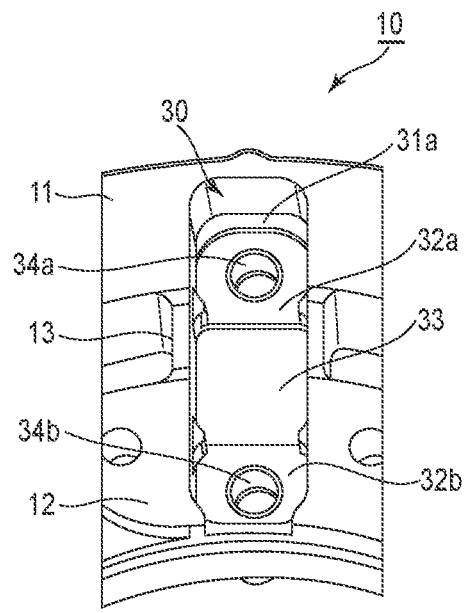
FIG. 3 is a perspective view showing an extracted attaching part of the strain sensor in an enlarged form.
Figure 4:
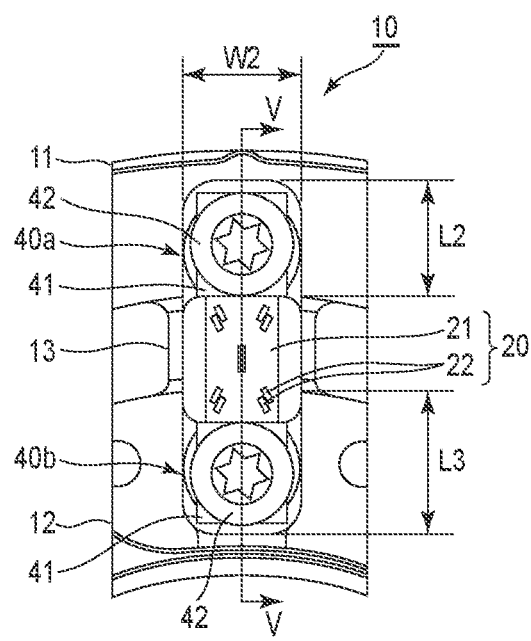
FIG. 4 is a plan view showing an extracted part of FIG. 2 in an enlarged form.
Figure 5:
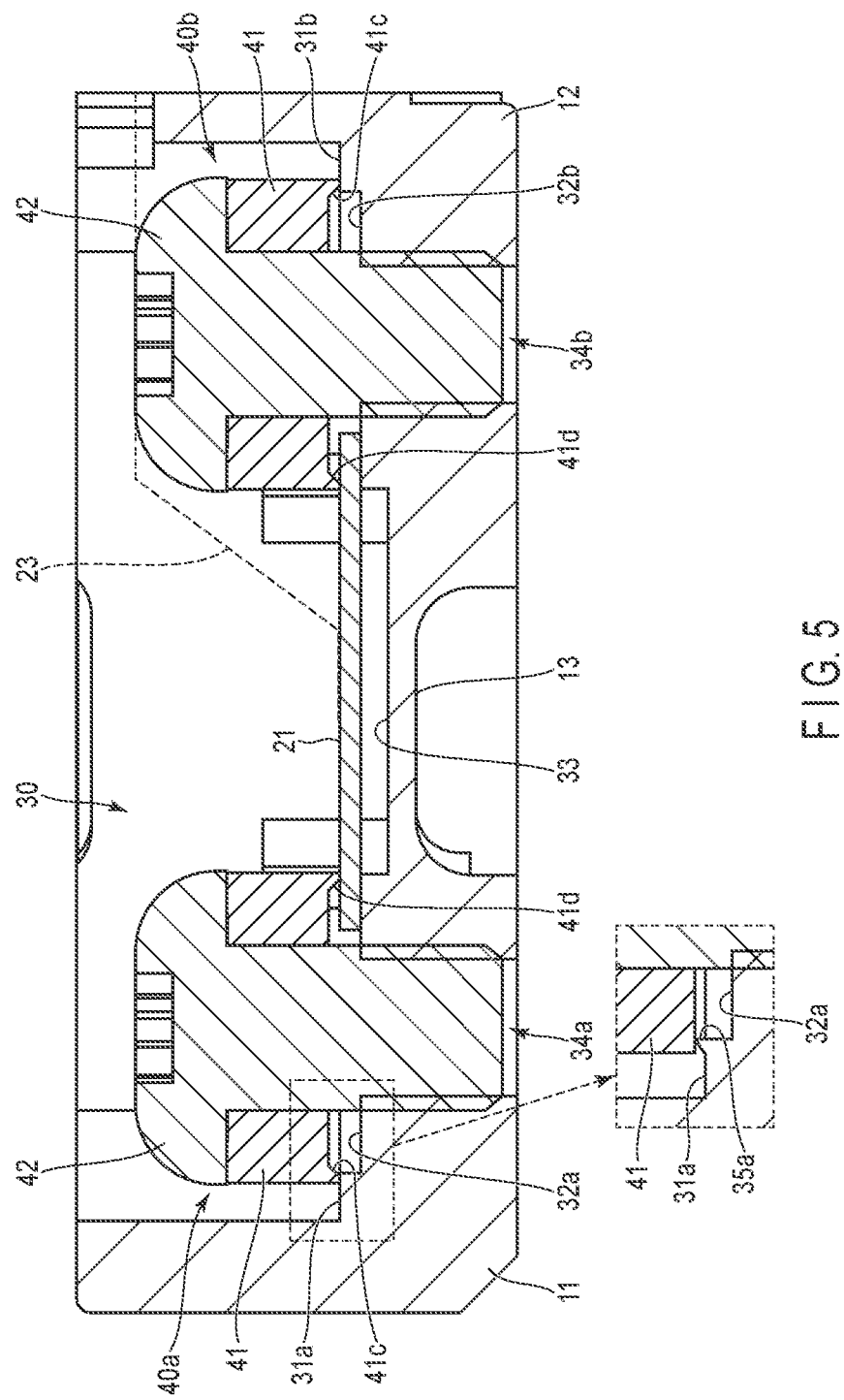
FIG. 5 is a cross-sectional view showing the cross section along line V-V of FIG. 4.

FIG. 3, FIG. 4, and FIG. 5 show the strain sensor 20 and attachment structure of the strain sensor 20.

FIG. 3 shows the configuration of the attaching part of the strain sensor 20. In the first structure 11, second structure 12, and plurality of third structures 13, a concave part 30 is wholly provided. At the bottom part of the concave part 30, a first bottom part 31a and second bottom part 32a lower than the first bottom part 31a are provided at a part corresponding to the first structure 11. A difference between the first bottom part 31a and second bottom part 32a in depth is made approximately equal to the thickness of the strain body 21 as shown in FIG. 5.

At the bottom part of the concave part 30, a first bottom part 31b and second bottom part 32b lower than the first bottom part 31b are also provided at a part corresponding to the second structure 12. A difference between the first bottom part 31b and second bottom part 32b is also made approximately equal to the thickness of the strain body 21.

At the bottom part of the concave part 30, a third bottom part 33 lower than the second bottom parts 32a and 32b is provided at a part corresponding to the third structure 13.

At approximately the central part of the second bottom part 32a corresponding to the first structure 11, an opening 34a is provided, and screw thread is provided inside the opening 34a. At also approximately the central part of the second bottom part 32b corresponding to the second structure 12, an opening 34b is provided, and screw thread is provided inside the opening 34b.

As shown in FIG. 4, the strain sensor 20 is provided inside the concave part 30 between the first structure 11 and the second structure 12. The strain sensor 20 includes a strain body 21 made of, for example, a metal, and a plurality of strain gages 22 serving as sensor elements arranged on one surface of the strain body 21.

The strain gage 22 is, for example, a thin-film resistor element, and a resistance value thereof changes concomitantly with deformation of the strain body 21. The plurality of strain gages 22 constitute a bridge circuit (not shown), and a change in the resistance value is detected by the bridge circuit as an electrical signal. The plurality of strain gages 22 are connected to one end part of a flexible board 23 (shown in FIG. 2, FIG. 5) provided at a central part of the strain body 21. The other end part of the flexible board 23 is connected to the processing circuit inside the case 15. The electric signal output from the bridge circuit is supplied to the processing circuit through the flexible board 23, and a torque detection signal functioning as a sensor signal is created in the processing circuit.

The strain body 21 has, for example, a rectangular shape, a length of the strain body 21 is made longer than the length of the third bottom part 33. The strain body 21 is, in a state where the strain body 21 is arranged inside the concave part 30, fixed to the first structure 11 and second structure 12 by means of a fixing device 40a and fixing device 40b.

More specifically, as shown in FIG. 5, the first end of the strain body 21 is placed on the second bottom part 32a of the first structure 11, and second end of the strain body 21 is placed on the second bottom part 32b of the second structure 12. That is, the strain body 21 is arranged between the opening 34a of the second bottom part 32a of the first structure 11 and opening 34b of the second bottom part 32b of the second structure 12.

The first end of the strain body 21 is fixed to the first structure 11 by the fixing device 40a arranged at a part of the concave part 30 corresponding to the first structure 11, and second end of the strain body 21 is fixed to the second structure 12 by the fixing device 40b arranged at a part of the concave part 30 corresponding to the second structure 12.

Both the fixing device 40a and fixing device 40b have the same configuration, and each of the fixing device 40a and fixing device 40b includes a fixing plate 41 and screw 42 each serving as fixing members. At the fixing device 40a, the fixing plate 41 is attached to the first structure 11 by means of the screw 42 to be screwed into the opening 34a. At the fixing device 40b, the fixing plate 41 is attached to the second structure 12 by means of the screw 42 to be screwed into the opening 34b.

The screw 42 is inserted into the opening 34a of the first structure or into the opening 34b of the second structure 12 from above each fixing plate 41 to thereby be screwed into the opening 34a or into the opening 34b.

When the screw 42 of the fixing device 40a is tightly fastened, the first end of the strain body 21 is fixed to the first structure 11 by the fixing plate 41 and, when the screw 42 of the fixing device 40b is tightly fastened, the second end of the strain body 21 is fixed to the second structure 12 by the fixing plate 41.

(Configuration of Fixing Plate)

Figure 6:
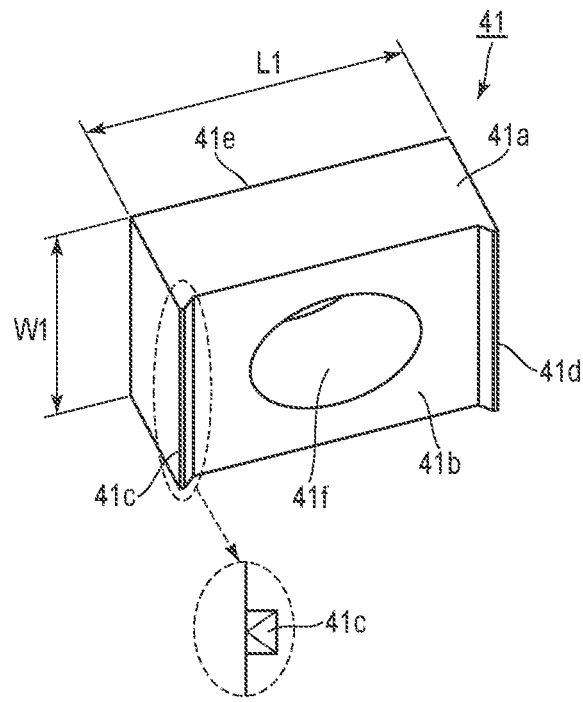
FIG. 6 is a perspective view showing a fixing plate serving as a fixing member shown in FIG. 3 in an enlarged form.

FIG. 6 shows a form of the fixing plate 41 according to this embodiment.

Although the fixing plate 41 is constituted of a metal identical to, for example, the first structure 11, the material for the fixing plate 41 is not limited to this, and the fixing plate 41 may also be constituted of other materials.

The fixing plate 41 has a main body 41a of a shape of, for example, a rectangular parallelepiped. The fixing plate 41 and main body 41a are identical to each other and, fixing plate 41 is also simply referred to as the main body 41a. Along, for example, the first side of the bottom face 41b of the main body 41a, a first protrusion 41c is provided and, along the second side parallel to the first side, a second protrusion 41d is provided. The first protrusion 41c and the second protrusion 41d each have linear shapes and are each protruded from the bottom face 41b in the same direction. Accordingly, the bottom face 41b is arranged at a position separate from a line connecting between a distal end of the first protrusion 41c and a distal end of second protrusion 41d. Furthermore, the main body 41a includes an opening 41f penetrating the main body 41a from the front face 41e to the bottom face 41b.

A width W1 of the fixing plate 41 is less than the width W2 (shown in FIG. 4) of the concave part 30 and length L1 of the fixing plate 41 is less than the length L2 (shown in FIG. 4) of the part of the concave part 30 corresponding to the first structure 11 or length L3 of the part of the concave part 30 corresponding to the second structure 12. Here, although the relationship between L2 and L3 satisfies the condition, for example, "L2<L3", the relationship is not limited to this. That is, it is sufficient if the length of the fixing plate 41 is such a length that the fixing plate 41 is enabled to, when the screws 42 are tightly fastened, come into contact with the first bottom part 31a and first end of the strain body 21 or come into contact with the first bottom part 31b and second end of the strain body 21.

More specifically, it is sufficient, in the state where the two fixing plates 41 are respectively inserted in the part of the concave part 30 corresponding to the first structure 11 and part thereof corresponding to the second structure 12 as shown in FIG. 4 and FIG. 5, if the first protrusion 41c of each fixing plate 41 can come into line contact with the first bottom part 31a or first bottom part 31b, and second protrusion 41d thereof can come into line contact with the first end or second end of the strain body 21.

As described above, in the state where the two fixing plates 41 are inserted in the concave part 30, each of the screws 42 is inserted into the opening 41f of each of the fixing plates 41 to be screwed into the opening 34a of the first structure 11 or into the opening 34b of the second structure 12, whereby the first protrusion 41c of the fixing plate 41 is brought into line contact with the first bottom part 31a or second bottom part 31b, and second protrusion 41d thereof is brought into line contact with the first end of the strain body 21 or second end thereof.

It should be noted that as shown in FIG. 6, the first protrusion 41c of the fixing plate 41 is made linear and first protrusion 41c comes into line contact with the first bottom part 31b. However, the shape of the first protrusion 41c is not limited to this and, for example, as shown in FIG. 6 by a broken line, the first protrusion 41c may be made a point-like protrusion and first protrusion 41c may come into point contact with the first bottom part 31b. Although the point-like first protrusion 41c is provided at approximately a central part of the first side, two first protrusions may be provided at, for example, both ends of the first side. Alternatively, three first protrusions may be provided at the central part of the first side and at both ends thereof.

And the fixing plate 41 includes the first protrusion 41c and second protrusion 41d. However, the fixing plate 41 may include only the second protrusion 41d, and each of the first structure 11 and the second structure 12 may include a protrusion substituting for the first protrusion 41c.

More specifically, as shown inside the broken line of FIG. 5, the first side of the fixing plate 41 includes no first protrusion 41c and is made flat similarly to the bottom face 41b. Instead, a protrusion 35a is provided on the first bottom part 31a of the first structure 11. The protrusion 35a is brought into line contact with the first side of the fixing plate 41. The second structure 12 side can also have the same configuration.

It is desirable that the shape of the protrusion 35a be a linear shape parallel to the second protrusion 41d. However, the shape of the protrusion 35a may also be made point-like similarly to the example shown in FIG. 6 and, in this case, the number of point-like protrusions 35a may be one or more.

Advantageous Effects of Embodiment

According to the embodiment described above, the fixing plate 41 includes the first protrusion 41c and second protrusion 41d and, by tightly fastening the screws 42, the first protrusion 41c comes into line contact with the first bottom part 31a or first bottom part 31b, and second protrusion 41d comes into line contact with the first end or second end of the strain body 21. Accordingly, as compared with, for example, the case where the strain body and fixing plate come into surface contact with each other, it is possible to fix the strain body 21 to the first structure 11 and second structure 12 with higher fixing pressure. Accordingly, it is possible to reduce the variation in the strength of fixing the strain body 21 to the first structure 11 and second structure 12, and prevent the sensor performance from being deteriorated.

Moreover, according to the fixing method using the fixing plate 41 of this embodiment, by only bringing the second protrusion 41d of each fixing plate 41 into line contact with the strain body 21, it is possible to fix the strain body 21 to the first structure 11 and second structure 12. Accordingly, unlike in the case where the strain body 21 is fixed to the first structure 11 and second structure 12 by, for example, welding, it is possible to prevent the strain body 21 and strain gages from being thermally deformed. Further, unlike in the case where the strain body 21 is fixed with an adhesive, no low-stiffness part is interposed between the strain body 21 and first structure 11 or second structure 12. Therefore, according to the fixing method using the fixing plate 41 of this embodiment, it is possible to securely transmit the force applied to the first structure and second structure 12 to the strain body 21, and improve the performance of the sensor.

Moreover, each of the fixing devices 40a and 40b is constituted of one fixing plate 41 and one screw 42. Accordingly, the number of parts count is small, and it is possible to prevent the fixing devices 40a and 40b from being upsized, and prevent the torque sensor 10 from being upsized.

Furthermore, each of the fixing devices 40a and 40b is constituted of one fixing plate 41 and one screw 42, and hence assembly of the fixing devices 40a and 40b is made easy.

Further, the screw 42 is inserted into the opening 34a of the first structure 11 or opening 34b of the second structure 12 from above each fixing plate 41 to thereby be screwed into the opening 34a or opening 34b. Accordingly, as compared with the case where, for example, the screw 42 is inserted into the opening 34a from the back side of the first structure 11 or into opening 34b from the back side of the second structure 12, it is possible to make the assembly work easier.

(Modified Examples of Fixing Plate)

First Modified Example

Figure 7:
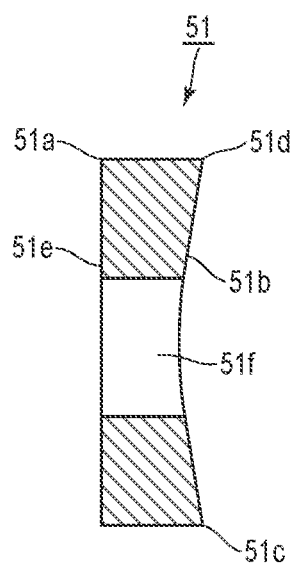
FIG. 7 is a cross-sectional view showing a first modified example of the fixing plate.

FIG. 7 shows a first modified example of the fixing plate. In the case of the embodiment shown in FIG. 6, the main body 41a includes the first protrusion 41c and second protrusion 41d on the flat bottom face 41b.

Conversely, in the first modified example, a main body 51a of a fixing plate 51 having a shape of, for example, a rectangular parallelepiped includes a curved bottom face 51b, first side of the bottom face 51b functions as a first protrusion 51c and second side thereof parallel to the first side functions as a second protrusion 51d. Accordingly, the curved bottom face 51b is arranged at a position separate from the line connecting between the first protrusion 51c and second protrusion 51d. At the central part of the bottom face 51b, an opening 51f penetrating the fixing plate 51 to the front face 51e is provided.

The first modified example described above also provides the same advantages as the previously described embodiment. Moreover, according to the second modified example, the bottom face 51b of the main body 51a is curved, and hence the elasticity of the fixing plate 51 is improved. Accordingly, it is possible to securely fix the strain body 21 by means of the fixing plate 51.

Furthermore, according to the first modified example, by only processing the bottom face of the main body 51a into a curved face, both the first protrusion 51c and second protrusion 51d can be formed, and hence it is possible to facilitate the manufacture.

Second Modified Example

Figure 8:
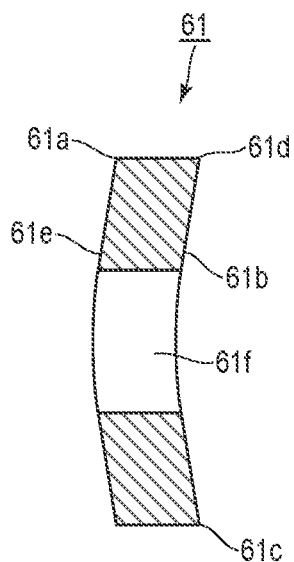
FIG. 8 is a cross-sectional view showing a second modified example of the fixing plate.

FIG. 8 shows a second modified example of the fixing plate. In the first modified example shown in FIG. 7, the main body 51a includes the curved bottom face 51b.

Conversely, in the second modified example, the whole of a main body 61a of a fixing plate 61 having a shape of, for example, a rectangular parallelepiped is curved. Accordingly, the fixing plate 61 includes a curved bottom face 61b, and first side of the bottom face 61b functions as the first protrusion 61c, and second side parallel to the first side functions as the second protrusion 61d. Accordingly, the curved bottom face 61b is arranged at a position separate from the line connecting between the first protrusion 61c and second protrusion 61d. At the central part of the bottom face 61b, an opening 61f penetrating the fixing plate 61 to the front face 61e is provided.

With the second modified example described above too, it is possible to obtain the same advantages as the previously described embodiment. Moreover, according to the second modified example, the whole of the main body 61a is curved, and hence the elasticity of the fixing plate 61 is improved. Accordingly, it is possible to more securely fix the strain body 21 by means of the fixing plate 61.

Furthermore, according to the second modified example, by only processing the main body 61a into a curved shape, both the first protrusion 61c and second protrusion 61d can be formed, and hence it is possible to facilitate the manufacture.

Third Modified Example

Figure 9:
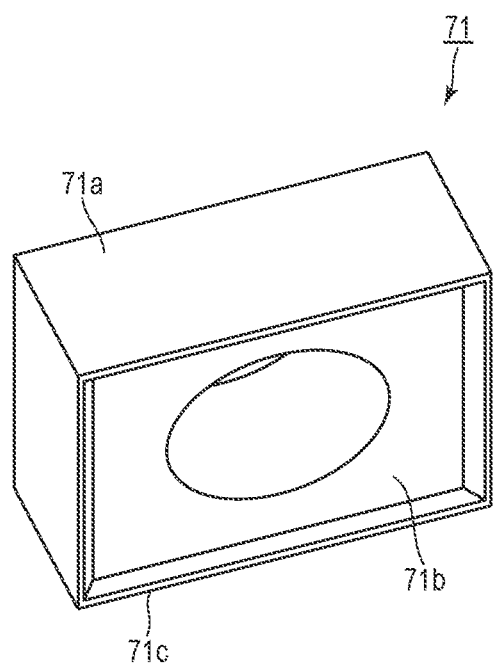
FIG. 9 is a perspective view showing a third modified example of the fixing plate.

FIG. 9 shows a third modified example of the fixing plate. In the embodiment and modified examples described above, the protrusions are provided at the two sides of the main body of the fixing plate.

Conversely, in the third modified example shown in FIG. 9, a main body 71a of a fixing plate 71 has a shape of, for example, a rectangular parallelepiped, and a protrusion 71c is provided along four sides of a bottom face 71b of the main body 71a. That is, the protrusion 71c is provided along the circumference of the bottom face 71b.

With the third modified example described above too, it is possible to obtain the same advantages as the embodiment described above. Moreover, by providing the protrusion 71c around the bottom face 71*b*, it is possible to enhance the stiffness of the fixing plate 71, and more securely fix the strain body 21.

Furthermore, although the description has been given of the case where the shape of the main body 71*a* of the fixing plate 71 is a rectangular parallelepiped, and shape of the bottom face 71*b* is a rectangle, it is also possible to make the shape of the main body 71*a* of the fixing plate 71 a regular hexahedron and make the shape of the bottom face 71*b* a regular square. In this case, by using any pair of two sides parallel to each other, it is possible to fix the strain body 21. Accordingly, it is not necessary to take the direction of the fixing plate 71 relative to the concave part 30 into consideration, and hence it is possible to simplify the assembly work.

It should be noted that in the first modified example and second modified example too, it is possible to provide a protrusion around the main body.

(Modified Example of Strain Body)

Figure 10:
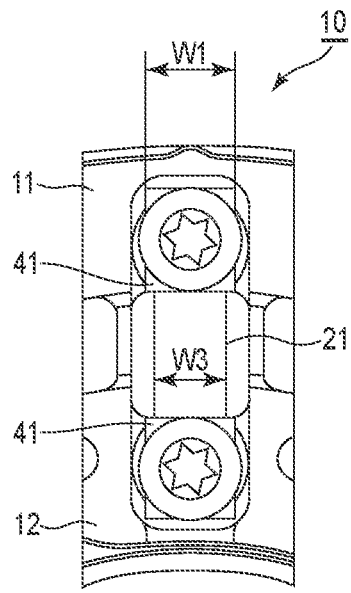
FIG. 10 is a plan view showing an example of widths of the fixing plate and strain body.

As shown in FIG. 10, in the embodiment described above, the width W3 of the strain body 21 is made less than the width W1 of the fixing plate 41.

Figure 11:
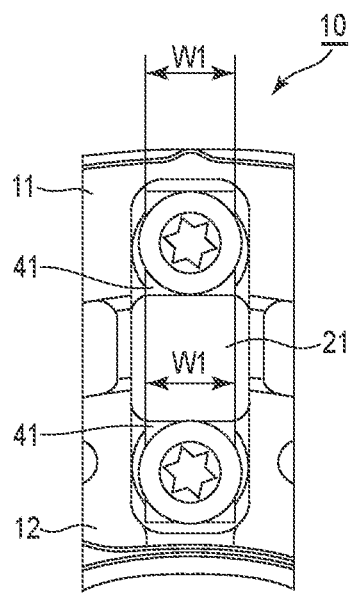
FIG. 11 is a plan view showing another example of widths of the fixing plate and strain body.

However, as shown in FIG. 11, it is also possible to make the width of the strain body 21 equal to the width W1 of the fixing plate 41.

When the width of the strain body 21 is made equal to the width W1 of the fixing plate 41 as described above, alignment of the fixing plate 41 and strain body 21 with each other is made easy and, it is possible to simplify the structure of the jig for aligning the fixing plate 41 and strain body 21 with each other, and improve the work efficiency.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A strain sensor fixing device comprising:
a fixing member which includes a first side, a second side parallel to the first side, and a face provided between the first side and the second side and including an opening, and in which the face is provided at a position separate from a line extending between distal ends of the first side and the second side, the first side is brought into contact with a first structure, and the second side is brought into line contact with an end part of a strain body constituting a strain sensor, the end part being provided on the first structure; and
a screw to be inserted into the opening and to be screwed into the first structure.

2. The strain sensor fixing device of claim 1, wherein the first side is brought into line contact or point contact with a first structure.

3. The strain sensor fixing device of claim 1, wherein
the fixing member includes a flat face provided between the first side and the second side and including the opening,
a first protrusion provided along the first side, and
a second protrusion provided along the second side and protruded in a direction identical to the first protrusion.

4. The strain sensor fixing device of claim 1, wherein fixing member includes a curved face provided between the first side and the second side and including the opening.

5. The strain sensor fixing device of claim 1, wherein the fixing member includes two parallel curved faces and the opening therein, and at least a portion of one of the curved faces is provided between the first side and the second side.

6. The strain sensor fixing device of claim 1, wherein the fixing member includes a third side and a fourth side each connecting between the first side and the second side, and the face is separate from a line extending between distal ends of the third side and the fourth side.

7. The strain sensor fixing device of claim 1, wherein the screw is inserted into the opening from one side of the fixing member on the opposite side of the first structure.

8. The strain sensor fixing device of claim 1, wherein a length of the second side of the fixing member is greater than a width of the strain body.

9. The strain sensor fixing device of claim 1, wherein the length of the second side of the fixing member is equal to the width of the strain body.

10. The strain sensor fixing device of claim 1, wherein the first side includes a first protrusion at a part thereof, and the first protrusion comes into point contact with the first structure.

11. The strain sensor fixing device of claim 1, wherein the first side of the fixing member is straight and comes into line contact or point contact with a protrusion provided on the first structure.

12. A torque sensor characterized by comprising:
a first structure;
a second structure;
a plurality of third structures connecting between the first structure and the second structure;
strain bodies each of which is provided between the first structure and the second structure and constitutes a strain sensor;
first fixing devices each of which is provided on the first structure and fixes a first end of the strain body to the first structure; and
second fixing devices each of which is provided on the second structure and fixes a second end of the strain body to the second structure, wherein
each of the first fixing device and the second fixing device includes a fixing member which includes a first side, a second side parallel to the first side, and a face provided between the first side and the second side and including an opening, and in which the face is provided at a position separate from a line extending between distal ends of the first side and the second side, the first side is brought into contact with the first structure, and the second side is brought into line contact with an end part of the strain body constituting the strain sensor, the end part being provided on the first structure, and
a screw to be inserted into the opening and to be screwed into the first structure.

13. The torque sensor of claim 12, wherein
the fixing member includes a flat face provided between the first side and the second side and including the opening,
a first protrusion provided along the first side, and
a second protrusion provided along the second side and protruded in a direction identical to the first protrusion.

14. The torque sensor of claim 12, wherein the fixing member includes a curved face provided between the first side and the second side and including the opening.

15. The torque sensor of claim 12, wherein the fixing member includes a third side and a fourth side each connecting between the first side and the second side, and the face is separate from a line extending between distal ends of the third side and the fourth side.

16. The torque sensor of claim 12, wherein the screw is inserted into the opening from one side of the fixing member on the opposite side of the first structure or the second structure.

17. The torque sensor of claim 12, wherein a length of the second side of the fixing member is greater than a width of the strain body.

18. The torque sensor of claim 12, wherein the length of the second side of the fixing member is equal to the width of the strain body.

19. The torque sensor of claim 12, wherein the first side includes a first protrusion at a part thereof, and the first protrusion comes into point contact with the first structure.

20. The torque sensor of claim 12, wherein the first side of the fixing member is straight and comes into line contact or point contact with a protrusion provided on the first structure.

* * * * *